May 15, 1923.

W. CLINE

AUTOMOBILE SIGNAL

Filed May 5, 1922

1,454,920

Inventor
Wesley Cline
By E. J. Fetherstonhaugh
Attorney.

Patented May 15, 1923.

1,454,920

UNITED STATES PATENT OFFICE.

WESLEY CLINE, OF EDMONTON, ALBERTA, CANADA.

AUTOMOBILE SIGNAL.

Application filed May 5, 1922. Serial No. 558,705.

*To all whom it may concern:*

Be it known that I, WESLEY CLINE, a subject of the King of Great Britain, and residing at the city of Edmonton, in the Province of Alberta, Dominion of Canada, have invented a new and useful Improvement in Automobile Signals, of which the following is the specification.

My invention relates to improvements in "automobile signals" and consists of an arm with hand attached, contained in a metal casing and which can be attached to windshield frame of an open car or to the wall of a closed car. The arm can be thrust out and the fingers of the hand extended or withdrawn back into casing with the fingers closing, by means of a lever placed in such a position as to be handy for operation by the driver of the car.

The object of the invention is to warn the driver of a car following, the intention of turning off in either direction, slowing down or stopping, and would be of especial benefit for a closed car or an open car with curtains attached.

The device could also be used on street cars to denote the direction of the car in coming to an intersection, of turning off to the right or left or continuing straight on, and this at night time could be denoted by the use of colored signal lights placed in upper portion of casing.

I attain these objects by means of the mechanism as illustrated in the accompanying drawings, in which:—

Similar letters refer to similar parts throughout the various views.

Figure 1:
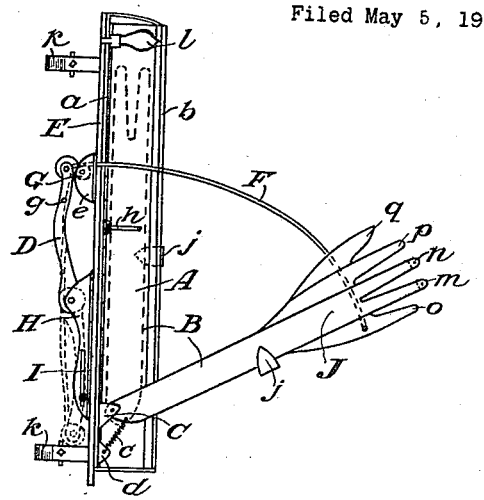
Fig. 1 is a side view, in part section, showing the arrangement of the lever with arm extended, and in dotted lines the position of lever with arm enclosed.
Figure 2:
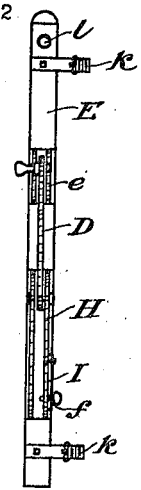
Fig. 2 is a back view showing the arrangement of brackets and lever.
Figure 3:
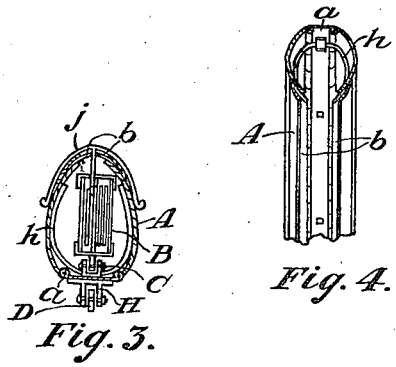
Fig. 3 is a cross section showing the position of arm inside casing when closed.
Figure 4:
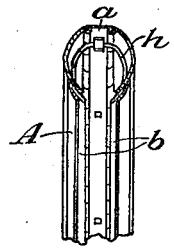
Fig. 4 is a sectional perspective view of casing when open, showing spring holding sides apart.
Figures 5, 6:
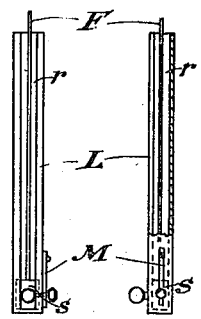
Fig. 5 is a front view of the pull release as an alternative to the lever.
Fig. 6 is a side view, part section, showing the pull release as an alternative to the lever.
Figure 7:
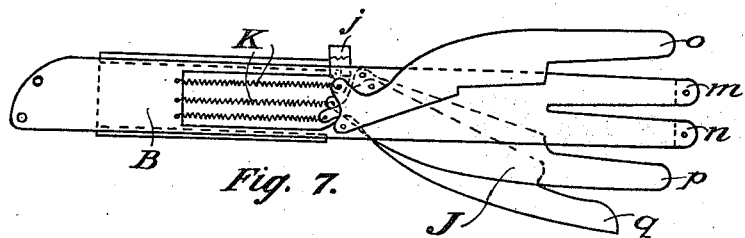
Fig. 7 is an enlarged detail of the arm showing the movable fingers and the manner in which they are attached to the arm.

A is the metal casing which holds the arm B. It is made in two halves with a strip $a$ in the shape of a hinge to form the back. The two halves are curved and hinged to strip $a$, meeting at the front, and having rubber strips $b$ their full lengths fitting in grooves formed on either half, to keep arm B from grating on being extended or withdrawn, and to also make a tight joint. The top and bottom of the two halves are turned over so as to overlap each other when casing is closed to form a covering.

The arm B is pivoted to bracket C at the base of the casing and has a spiral spring $c$ connecting same to a small bracket $d$ which is attached to lower portion of hinge $a$ below bracket C and is for the purpose of pulling arm down and holding same out when signal is in operation. The arm B is operated by a lever D attached to the back of strip E to which the device is secured. A wire connection F, attached at one end to the handle of lever D and the other end to arm B, is guided by a small pulley G secured in bracket $e$ attached to strip E and operates the arm B by means of the lever D. The lever D is pivoted in a bracket H attached to lower end of strip E. When the device is closed, the lever D is held down by a spring clip I attached to side of bracket H and which has a pin $f$ projecting through a small hole in side of bracket, to engage with notch $g$ in handle of lever D. When desired to operate arm B, the spring clip I is lifted, disengaging the pin from notch in the arm, allowing the lever to fly upwards, forcing the arm outwards. A small wire spring $h$ is placed inside of casing which presses outward against the two sides, keeping same open when arm is out. When the arm is drawn back into the casing, a clasp $j$, affixed to the arm, catches the two sides of the casing, drawing them tightly together when arm is inside. Two brackets $k$ are attached to the back strip E at the upper and lower end of casing and are secured to the frame of the windshield of an open car. A small electric bulb $l$ can be attached inside the casing at the upper end and connected to the battery, to illuminate the arm at night time when casing is open and arm extended.

The arm B has a hand J formed at the outer end, with folding fingers which spread out when arm is projected and fold inward when arm is withdrawn. The second and third fingers $m$ and $n$ are formed at the end of strips composing the arm B. The little finger $o$, the index finger $p$ and the thumb $q$ are made in separate pieces and pivoted in the spaces formed between the three strips forming the arm B. When the arm B is exposed, the fingers spread in the form of an open hand and are held in that position by springs K attached to the pivoted ends of the fingers, which are so shaped and pivoted that the pull of the springs keep them spread out. The centre strip of the arm B, which is slightly longer than the two outer strips, has a portion cut out to allow space for the springs K which attach same to the pivoted ends of fingers.

L is a sliding catch in the form of a pull, as an alternative for lever connection D, and can be used where the lower portion of windshield is movable and lever could not be used. It consists of a groove $r$ with the pull $s$ having the wire F attached to same. The spring clip M engages the pull $s$ holding same in place and on the spring being lifted, the pull is disengaged, allowing same to slide up the groove $r$, releasing arm B.

When the device is used on a closed car, the strip E with brackets $k$ can be removed and the device attached to the frame of the car, with the lever or pull arrangement placed on the inside of frame.

What I claim as my invention is:—

An automobile signal comprising a casing having a front in two parts hinged to a back strip and spring-held to its open position, an arm pivotally secured in said casing and spring pulled in a downward direction and having fixed fingers and pivoted fingers spring-held to their open position, a lever pivoted to said casing and flexibly connected with said arm for raising purposes, a lamp within said casing, and a clasp attached to said arm for engaging and closing the front of said casing.

Signed at the city of Edmonton, this 13th day of April, 1922.

WESLEY CLINE. [L. S.]

In the presence of—
GLADY S. CUFF,
L. O. AURENT.